United States Patent [19]

Frank

[11] Patent Number: 5,237,133
[45] Date of Patent: Aug. 17, 1993

[54] SAFETY IGNITION SWITCH
[75] Inventor: Carl Frank, Sharon, Mass.
[73] Assignee: Joseph Pollak Corporation, Boston, Mass.
[21] Appl. No.: 860,173
[22] Filed: Mar. 30, 1992
[51] Int. Cl.5 ................... H01H 21/50; H01H 17/00
[52] U.S. Cl. ................. 200/11 C; 200/52 R; 200/543
[58] Field of Search ............... 200/11 C, 11 J, 52 R, 200/543, 334, 42.01–43.22

[56] References Cited

U.S. PATENT DOCUMENTS

| | | | |
|---|---|---|---|
| 3,786,892 | 1/1974 | Horton | 440/85 |
| 3,801,767 | 4/1974 | Marks | 200/543 |
| 3,821,504 | 6/1974 | Schomaker et al. | 200/52 R |
| 3,849,612 | 11/1974 | Cobb et al. | 200/11 J |
| 3,898,398 | 8/1975 | Borst et al. | 280/43.08 |
| 4,250,358 | 2/1981 | Gilbertson | 200/52 R |

Primary Examiner—J. R. Scott
Attorney, Agent, or Firm—Kenway & Crowley

[57] ABSTRACT

A vehicular engine safety switch having two or more functional positions, which includes a removable restraining device such as a clip or a pin which is flexibly attachable to the body or apparel of the vehicle operator. In the primary functional mode, the clip is in place on the switch and the engine may be started. Movement of the operator from the switch by a distance determined by the length of a flexible lanyard removes the clip, and the switch returns under spring pressure to an OFF position. The engine may be restarted with or without the clip in place, the latter condition occurring, for example, if the operator has been ejected from the vehicle. The safety action of the switch is achieved by the interaction of a specially formed detent sleeve and spring-loaded detent ball, and a lock cylinder rotationally and axially spring biased relative to the detent sleeve.

8 Claims, 3 Drawing Sheets

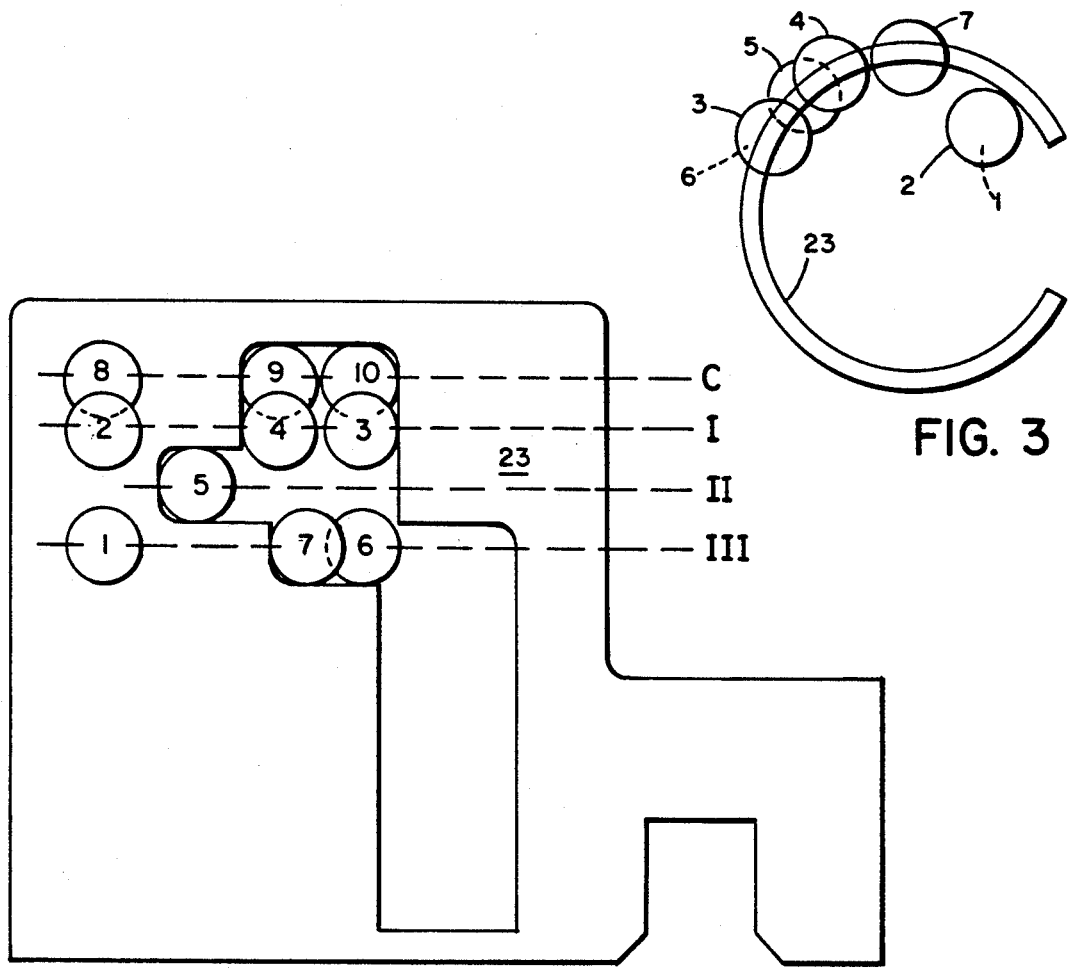
FIG. 3
FIG. 2
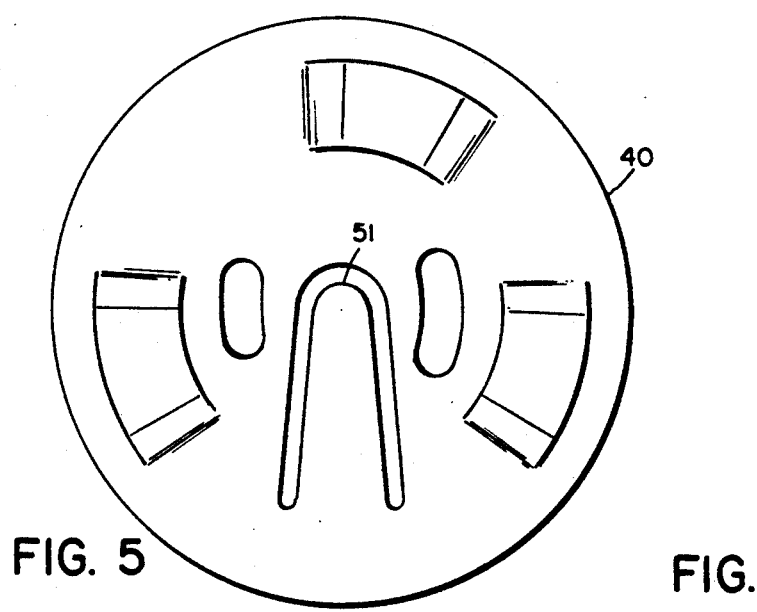
FIG. 5
FIG. 6

SAFETY IGNITION SWITCH

BACKGROUND OF THE INVENTION

The present invention relates in general to an ignition switch cut-off device for a vehicle to cut off the motor in the event that the operator is thrown, or falls away from, the vehicle controls. More particularly, the invention is organized about a switch and a removable safety clip in which provision is made for removal of the clip to turn off the motor and then allowing the restarting of the motor with or without the safety clip in place.

Operation of vehicles, such as motor boats, tractors, riding mowers, snowmobiles or the like runs the risk of the driver being thrown or falling away from the vehicle controls. With an open vehicle, he may possibly be ejected and then run over or hit by the vehicle as it continues to travel. A motor boat especially may very easily throw the operator out if the boat hits a log or even a wave in a certain manner at high speed. Usually, the speed is set by the throttle lever and the direction by the steering wheel or tiller so the boat will continue on its path until it runs out of gas or hits an object. If the path set happens to be curved, the boat will continue to circle and is likely to hit the driver previously thrown into the water. Various devices have been proposed or built to cut off the engine if the driver is separated from the controls; however, known devices are expensive, complicated, difficult to install, and in some cases, frequently unreliable.

SUMMARY OF THE INVENTION

The object of the present invention is a simple, effective, and easy-to-install combination ignition switch and cut-off device for a vehicle. The device, which may be a clip, when in place on the switch, allows a normal mode of operation such that the vehicle motor can be started at a START position, continue running when the ignition switch key is at an ACCESSORY ON position and stop when the ignition switch key is turned to an OFF position. A flexible pull means such as a cord, chain, or lanyard of a given length is attached to the safety clip and is connected to the person or apparel of the vehicle operator whereby the clip will be pulled from the switch to turn the vehicle's motor to an OFF position in the event that the operator moves a predetermined distance as by being thrown or falling from the vehicle.

Also, there is an alternative START, ACCESSORY ON, and OFF mode of operation which is made available to a substitute operator after the safety device has been pulled from the switch. In both the normal and alternative START modes, a manually operable choke is available at the switch.

For a better understanding of the present invention, attention should be directed to the following description of a preferred embodiment which should be read with reference to the appended drawing in which:

DESCRIPTION OF THE DRAWINGS

FIGS. 2, 3 and 4 illustrate graphically the operation of the detent system of said safety switch; and FIGS. 5 and 6 show part of the electrical switching mechanism of said safety switch.

DESCRIPTION OF A PREFERRED EMBODIMENT

Figure 1:
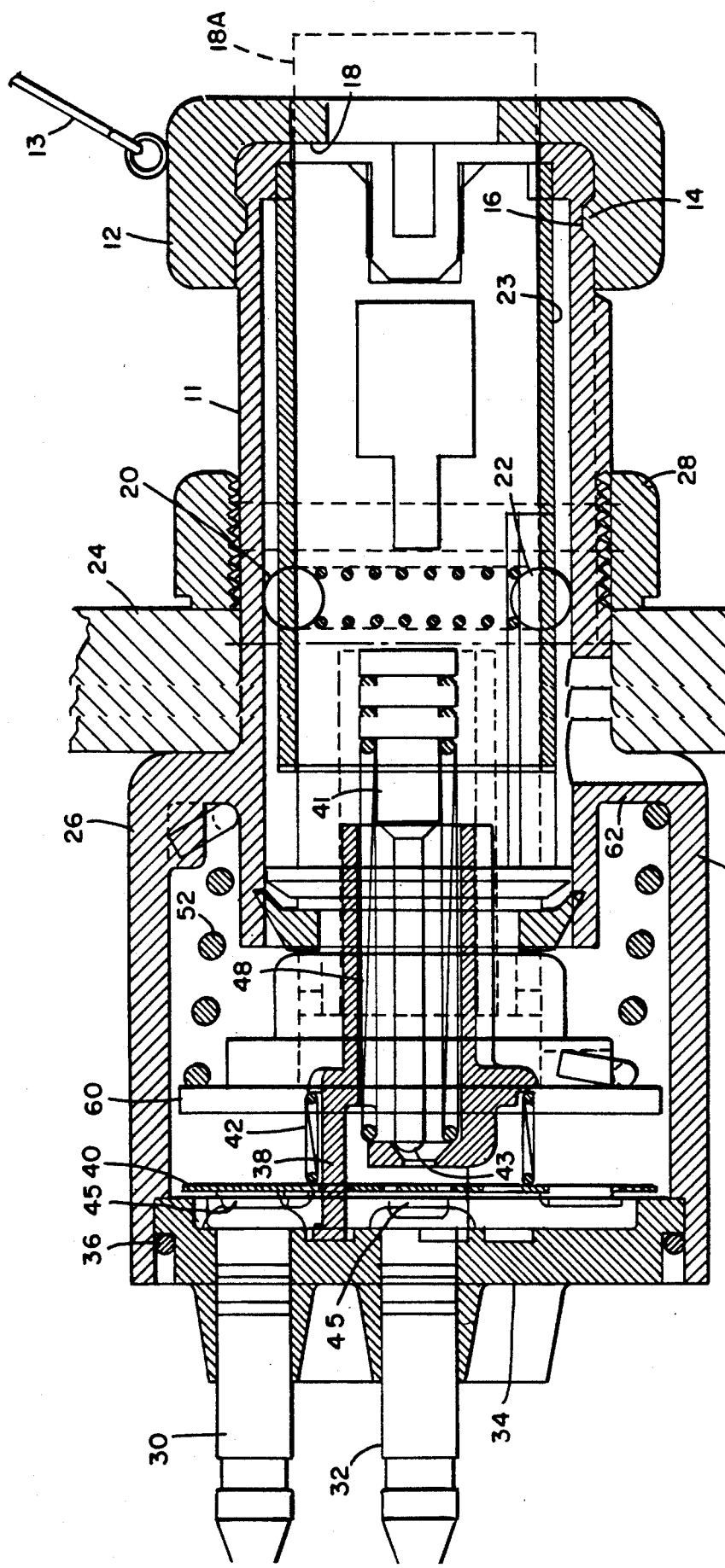
FIG. 1 is a view in cross-section of a safety switch constructed in accordance with the present invention.

In the cross-sectional view of FIG. 1, a switch body 10 is shown with a safety clip 12 installed on the end of the neck 11 of the switch. The safety clip is connected by a lanyard 13 or other flexible cord or connector to the person or clothing of an operator. The clip 12 is made of resilient plastic material and has an internal shoulder 14 which snaps into a similarly shaped matching groove 16 formed adjacent the end of the neck of the switch. The clip 12 when snapped into place bears upon and holds a lock cylinder 18 flush with the end of the neck of the switch. With the safety clip thus in place, the lock cylinder when turned utilizing a key as described hereinbelow is restricted to a given axial position of the cylinder relative to the body of the switch 10. This rotational movement of the lock cylinder carries detent balls 20 and 22 in given circumferential paths relative to detent sleeve 23.

The switch as shown is mounted in a panel 24 such as the dashboard of a boat or other vehicle. The body 10 of the switch is of greater diameter than that of the neck 11 and forms an external shoulder. The neck 11 passes through an opening in the dashboard 24 and has a threaded area on which a mounting nut 28 is engaged to hold the shoulder of the switch in position against the dashboard.

The components in the body of the switch are for the most part conventional and include a plurality of contacts which pass through and are held in place in an insulating base 34, the contacts 30 and 32 being typical. The base 34 may be pressed into an internally shouldered recess in the switch body 10 and may be sealed by an O-ring 36 and both held in place by forming the end of the housing as shown.

A switch rotor 38 supports a wiper 40 with integral contacts 45 which make wiping electrical contact with the top of the contacts 30 and 32. The wiper 40, shown and described in greater detail below, also includes a tongue 51 which may be depressed to activate a choke for the motor. A spring 42 maintains contact pressure between the wiper contacts and the fixed contacts in the base 34. The rotor 38 is hollow and accommodates a coiled compression spring 48. A heavy torsion spring 52 is coiled within the housing 10 and bears upon a flange 60 at one end and on an interior circumferential recess 62 in the housing 10 at its other end. The torsion spring 52 normally biases the lock cylinder of the switch in a counter-clockwise or "off" direction relative to the detent sleeve 23 and the body of the switch, its force being overcome by turning of the key in a clockwise direction to start or run the motor and accessories.

Figure 4:
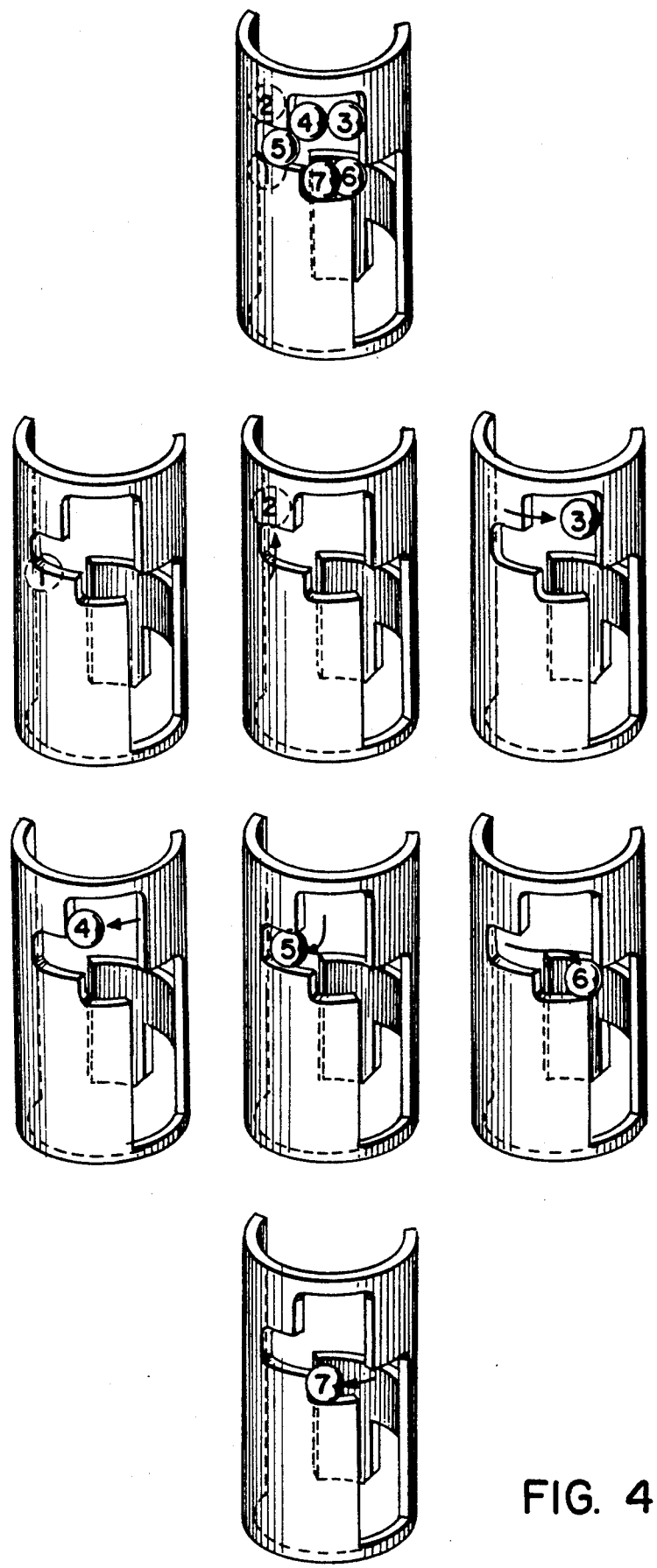

In FIGS. 2, 3 and 4, the detent operation may be seen. The detent sleeve is shown in FIG. 2 as laid out planarly before being formed into a sleeve in the fashion indicated by FIG. 3. The sequence of positions of the detent ball relative to the apertured detent sleeve 23 is shown in FIG. 4.

FIG. 2 shows the detent ball in position 1 where it rests before installation of the safety clip 12. When the clip 12 is installed, the lock cylinder 18 moves axially relative to the detent sleeve 23 and the detent ball moves to position 2. When the operator inserts the key through the opening in the clip 12 and into the lock cylinder, he then can turn the lock cylinder from the 0° OFF position 2 first through an approximately 45° RUN and ACCESSORY ON detent position 4 and then further against the return bias force of the torsion spring 52 to an approximately 75° momentary contact START position 3. The detent ball follows path I on the detent sleeve, START occurring as the key is held momentarily at the 75° point shown as position 3 of the circumferential path. When the key is released, the detent ball under the influence of the torsion spring 52 drops back to lodge in the fixed detent RUN and ACCESSORY ON position 4 against the detent sleeve wall at the 45° point.

During the START operation, the operator may wish to utilize the PUSH-TO-CHOKE feature of the switch. The lock cylinder is pushed axially into the switch and physically contacts the base of a plunger 41 to move it forward. The tip 43 of the plunger contacts a tongue 51 formed in the wiper 40 and forces it in an axial direction to complete a circuit which electrically actuates a choke for the vehicle motor. The relative positions of the detent ball and the detent sleeve when the choke is actuated are indicated at line C in FIG. 2 where, in position 8, the choke is off and in positions 9 and 10 the choke is on.

Should an accident occur to cause the vehicle operator to be thrown from the vehicle controls, the safety clip 12, which is connected to his clothing or person by the lanyard 13, is snatched from the switch, causing the lock cylinder to rotate and spring outwardly from the neck of the switch and the detent ball to assume the fixed detent position 5 or 1 in path II as shown in FIG. 2. It is the combined influence or the torsion spring 52 and the compression spring 48 that causes the lock cylinder to so move, and the motion is arrested as the detent ball lodges in the detent sleeve at the fixed EMERGENCY OFF position 5 or 1.

Restarting the motor by a different operator is possible without need for replacing the safety clip, which presumably remains with the departed operator. The new operator turning the key manually overcomes the force of the torsion spring 52, and the compression spring 48 forces the detent ball axially toward a path II which includes the fixed detent RUN, ACCESSORY ON position 7 and the momentary contact START position 6. As in the original START mode, START is initiated in the alternative mode by momentarily rotating the lock cylinder against the force of the torsion spring 52 to the START position 6. Also as in the original START mode, the manual PUSH-TO-CHOKE action is available to the operator by holding the key to prevent its rotation and pushing the lock cylinder into the switch. Once the motor is started, the operator releases the key, and the detent ball is forced back to the fixed detent RUN, ACCESSORY ON position 7 by the torsion spring 52.

In the event the safety clip is accidentally detached and remains in the vehicle or is otherwise available, it may be reinstalled and normal START may be had with the accompanying safety switch operation.

The CHOKE-TO-START function is achieved by the provision of a depressible tongue formed in the wiper 40 as best shown in FIGS. 5 and 6. The wiper may be made of a conductive, springy material such as beryllium copper and may include a depressible tongue such as 51 formed as by stamping or other metal forming process. The V-shaped opening which defines the tongue 51 in the wiper 40 has its rounded end adjacent the center of the wiper and the rounded end of the tongue is axially aligned with the tip 43 of the plunger 41. When the tongue is depressed by axial movement of the lock cylinder 18 and plunger 41, it closes a circuit which actuates the choke on the vehicle motor.

The present invention should be limited only by the spirit and scope of the appended claims. What is claimed is:

1. In a vehicular motor switch having a generally cylindrical body, operator safety apparatus comprising a detent system disposed in said switch, a lock cylinder axially and rotatably movable in said switch relative to said detent system, said detent system including a stationary apertured sleeve and a detent ball movable with said lock cylinder whereby said lock cylinder may be disposed selectively in at least START, ACCESSORY ON and OFF positions for the operation of said motor, and a safety clip detachably mounted on said switch to hold said lock cylinder in a predetermined safety position during vehicular movement, and means responsive to removal of said clip for causing axial and rotational movement of said lock cylinder relative to said detent sleeve to assume an OFF position.

2. In a vehicular motor switch as defined in claim 1, the combination which includes a first compression spring normally urging said lock cylinder axially out of said switch body and a torsion spring normally urging said lock cylinder in a predetermined rotational direction relative to said detent sleeve.

3. In a vehicular motor switch as defined in claim 1, the combination which includes flexible means connecting said safety clip to the person or apparel of said operator, said flexible means being of a length to detach said safety clip from said switch upon movement of said operator a predetermined distance from said switch.

4. In a vehicular motor switch as defined in claim 2, the combination in which said lock cylinder and detent ball are rotatable with respect to said detent sleeve in any of a plurality of axially spaced rotational paths in which said switch assumes a plurality of electrical states, one of said rotational paths including an EMERGENCY OFF position, said first compression spring and said torsion spring urging said detent ball to follow said one of said rotational paths upon removal of said safety clip, causing said switch to change electrical state and turn off the motor.

5. In a vehicular motor switch as defined in claim 2, the combination in which said detent ball is constrained to follow rotational paths by said first compression spring upon normal rotation of said lock cylinder relative to said detent sleeve during the period of attachment of said safety clip to said switch, said second rotational path including normal OFF, ACCESSORY ON and START positions.

6. In a vehicular motor switch as defined in claim 5, the combination in which said detent ball is constrained to follow a third rotational path by said first compression spring upon manual rotation of said lock cylinder relative to said detent sleeve against the bias of said torsion spring, said third rotational path including alternative OFF, ACCESSORY ON and START positions.

7. In a vehicular motor switch as defined in claim 5 or 6, the combination in which said START positions are momentary contact positions and said ACCESSORY ON positions are fixed contact positions.

8. A motor choke system for apparatus as defined in claim 4, comprising an electrical actuator wherein said lock cylinder is axially movable relative to said switch body to a choke position axially displaced from said plurality of paths, movement of said lock cylinder to said choke position energizing said electrical actuator to operate said motor choke system.

* * * * *